United States Patent
Fujii et al.

[11] Patent Number: 5,824,965
[45] Date of Patent: Oct. 20, 1998

[54] LOAD TRANSFER AND LOADING DEVICE WITH WEIGHT MEASUREMENT

[75] Inventors: Satoshi Fujii; Shoji Tozawa; Tomoaki Ono, all of Hyogo-ken, Japan

[73] Assignee: Shin Caterpillar Mitsubishi Ltd., Tokyo, Japan

[21] Appl. No.: 892,230

[22] Filed: Jul. 14, 1997

Related U.S. Application Data

[63] Continuation of Ser. No. 305,648, Sep. 14, 1994, abandoned.

[30] Foreign Application Priority Data

Sep. 14, 1993 [JP] Japan ................................. 5-229020

[51] Int. Cl.$^6$ ................................................ G01G 19/08
[52] U.S. Cl. ............................................................ 177/136
[58] Field of Search .................................... 177/136, 141, 177/211

[56] References Cited

U.S. PATENT DOCUMENTS

| | | | |
|---|---|---|---|
| 3,754,610 | 8/1973 | Paelian et al. | 177/211 |
| 3,857,452 | 12/1974 | Hartman | 177/139 |
| 4,499,960 | 2/1985 | Ehrich et al. | 177/25.13 |
| 4,627,013 | 12/1986 | Ichiyama et al. | 177/139 X |
| 4,809,794 | 3/1989 | Blair et al. | 177/139 |

*Primary Examiner*—Hezron E. Williams
*Assistant Examiner*—Randy W. Gibson
*Attorney, Agent, or Firm*—Fish & Richardson P.C.

[57] ABSTRACT

A load transfer and loading device equipped with a boom, a stick, and a bucket which are pin-coupled to each other for loading a load into the bucket, and transferring and loading it onto a specified position. The load transfer and loading device includes a weighing means for calculating the weight of the load in the bucket from a load applied to a pin coupling the boom to the stick and the position of the boom and the stick in accordance with specified equations.

16 Claims, 5 Drawing Sheets

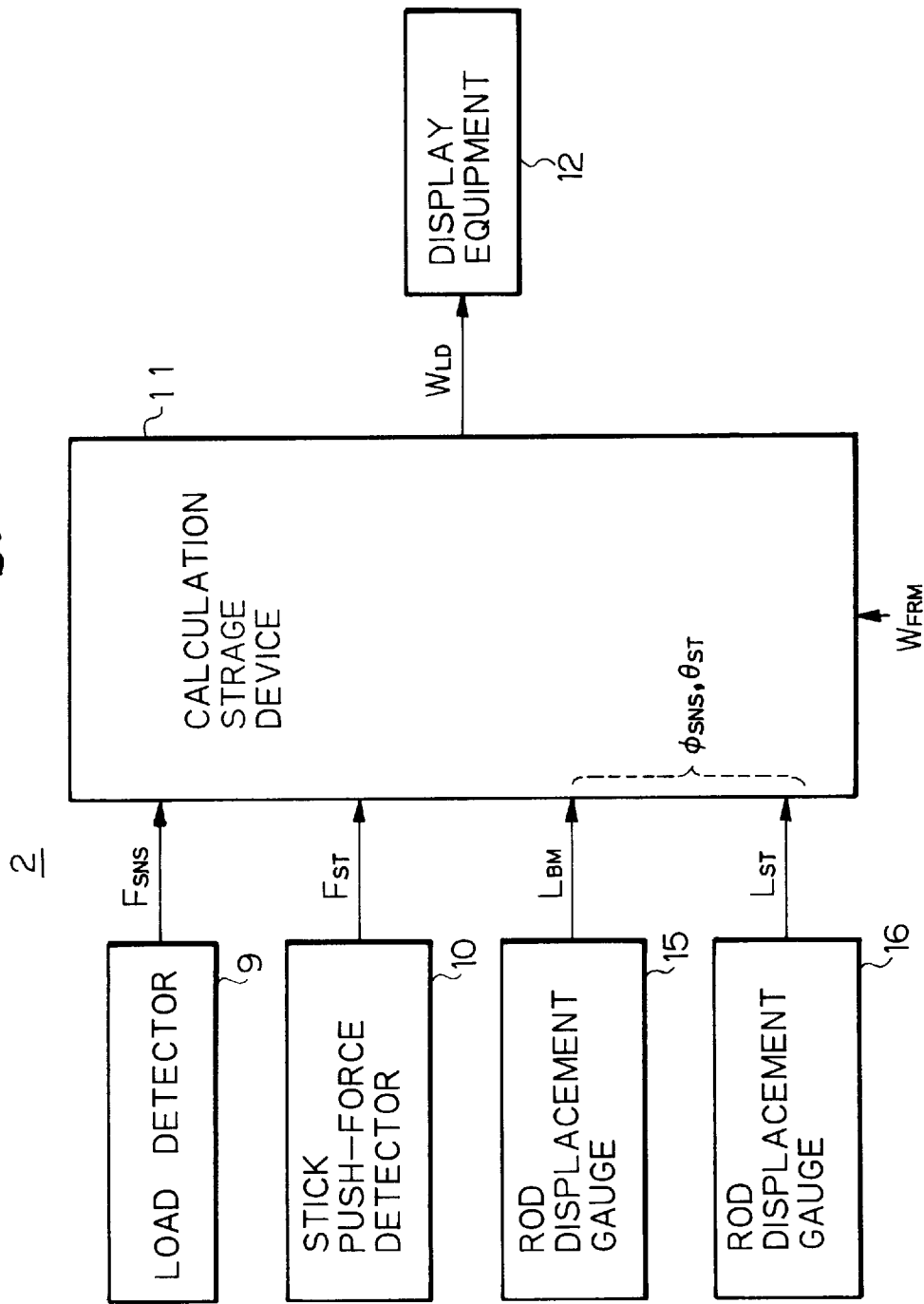

LOAD TRANSFER AND LOADING DEVICE WITH WEIGHT MEASUREMENT

This application is a continuation of U.S. application Ser. No. 08/305,648, filed Sep. 14, 1994, now abandoned.

BACKGROUND OF THE INVENTION:

1. Field of the Invention

The present invention relates to a load transfer and loading device capable of measuring and displaying the weight of a load when it is loaded into a bucket.

2. Description of the Related Art

Among the various types of construction machines useful in civil engineering work for excavating base rocks or removing sediment, hydraulic shovels are the most widely used to transfer and load rocks and sediment. A hydraulic shovel has a structure in which booms extend from an upper structure supported on an undercarriage and sticks coupled to the end of the booms support the bucket. Sediment can be loaded into a bucket or unloaded from the bucket by oscillating movable sections using the corresponding driving hydraulic cylinder. In most cases, sediment in the bucket is loaded onto a truck suitable for sediment transfer. In such a case, however, since the maximum loading capacity per truck is limited by law, care must be taken so as not to exceed this maximum loading capacity.

With the above conventional hydraulic shovel, the weight of sediment loaded into a bucket is normally determined by visual estimation by an operator. It is thus difficult to determine whether or not the total weight of the sediment loaded onto a truck has reached the maximum loading capacity and, therefore, the maximum loading capacity is often exceeded which may result in serious accidents. Otherwise, loading is often finished before the maximum loading capacity is reached which reduces loading efficiency. In addition, the visual estimation of weight tends to fail due to the difference in specific gravity of the sediment, i.e. two lamps of sediment of seemingly the same volume often have different weights due to such differences in specific gravity.

In another method, a loading weight measurement device is used wherein the weight of a truck is measured twice: i.e. when the truck is empty and when a bucket is loaded, and the difference between the two measured values determines a loading weight. Even when such a device is used, the operator must conduct a trial-and-error operation to unload an excess of sediment from the truck when such excess loading is found. Such a trial-and-error operation, however, prevents the quick completion of loading to its maximum loading capacity. Another method has been proposed wherein, instead of measuring the loading weight of a truck, sediment loaded in a bucket is once emptied into a weighing equipment, the weight of the sediment is measured, the sediment is then taken back into the bucket, which is then loaded onto a truck, and the measured value of the sediment in the respective measurement are summed to obtain the total loading weight. However, this method requires the troublesome operation of emptying the sediment from a bucket into the weighing equipment and, after measurement, putting it back again into the bucket, and thus takes an excessive amount of time. As a result, this method also prevents efficient loading.

SUMMARY OF THE INVENTION

This invention provides a load transfer and loading device which enables measurement and display of the weight of sediment when it is loaded into a bucket to prevent excess loading onto a truck or other transfer means.

This invention provides a load transfer and loading device equipped with a boom, a stick, and a bucket which are pin-coupled to each other for loading a load into the bucket, and transferring and loading it onto a specified position. The load transfer and loading device includes a weighing means for calculating the weight of the load in the bucket from a load applied to a pin coupling the boom to the stick and the position of the boom and the stick in accordance with specified equations.

In accordance with one preferred embodiment of the invention, the load transfer and loading device includes a load detector for detecting a load $F_{SNS}$ applied to the pin coupling the boom to the stick and a push-force detector for detecting the push force $F_{ST}$ applied to the stick for maintaining the position of the stick to calculate the weight $W_{LD}$ of the load in the bucket in accordance with the following equation:

$$W_{LD}=[\{F_{SNS}+F_{ST} \cos(\phi_{SNS}-\theta_{ST})\}/\sin \phi_{SNS}]-W_{FRM}$$

wherein $W_{FRM}$ is the known sum weight of the stick and bucket, $\phi_{SNS}$ is the angle between the load measurement axis of the load detector and a specified direction, and $\theta_{ST}$ is the angle between the direction of the push force applied to the stick and the specified direction.

In accordance with another preferred embodiment of the invention, the load transfer and loading device includes a load detector for detecting the load $F_{SNS}$ applied to the pin coupling the boom to the stick to calculate the weight $W_{LD}$ in accordance with the following equation:

$$W_{LD}=U/V$$

wherein $$U=\{L_{FRM} \cos(\phi_{SNS}-\theta_{ST})+L_S \sin \phi_{SNS}\}W_{FRM}+F_{SNS}L_S$$

$$V=-\{L_{LD} \cos(\phi_{SNS}-\theta_{ST})+L_S \sin \phi_{SNS}\}$$

wherein $W_{FRM}$ is the known sum weight of the stick and bucket, $\phi_{SNS}$ is the angle between the load measurement axis of the load detector and a specified direction, $\theta_{ST}$ is the angle between the direction of the push force applied to the stick and the specified direction, and $L_S$, $L_{FRM}$, and $L_{LD}$ are lengths of the arms of rotation moment caused around the pin by the push force $F_{ST}$, the sum weight $W_{FRM}$, and the loading weight $W_{LD}$ of the bucket.

With the above constitution, the weight of the load in the bucket is calculated from the load applied to the pin coupling the boom to the stick and the position of the boom and the stick or the boom, the stick and the bucket in accordance with the specified equations to allow the weight of the load transferred and loaded by the bucket to be measured accurately in each loading operation.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 6 is a block diagram showing the constitution of the weighing equipment shown in FIG. 1.

DETAILED DESCRIPTION OF THE INVENTION

Embodiments of this invention are described below with reference to FIGS. 1 to 7.

Figure 1:
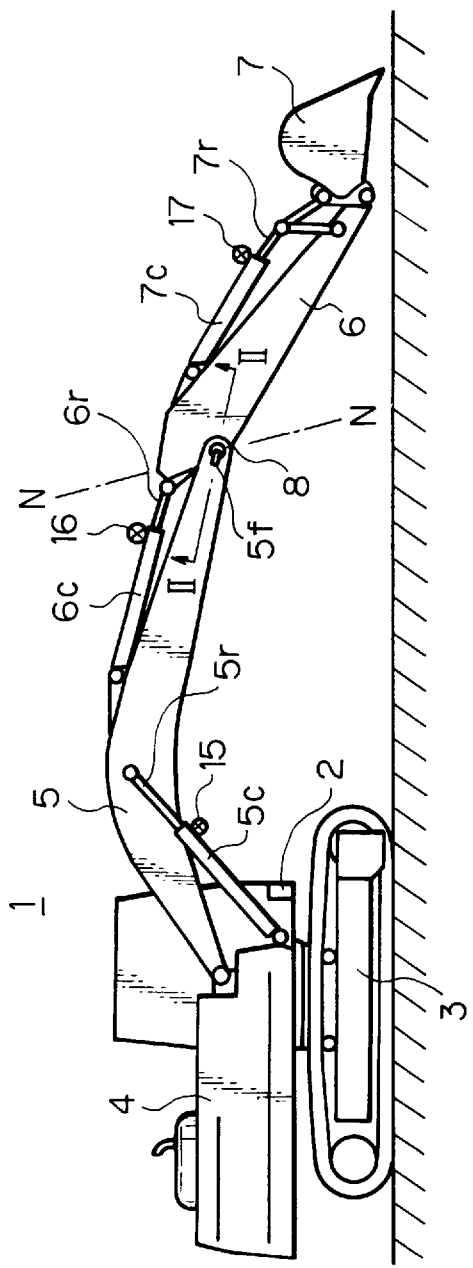
FIG. 1 is a side elevational view of an embodiment of a load transfer and loading device in accordance with this invention.
Figure 2:
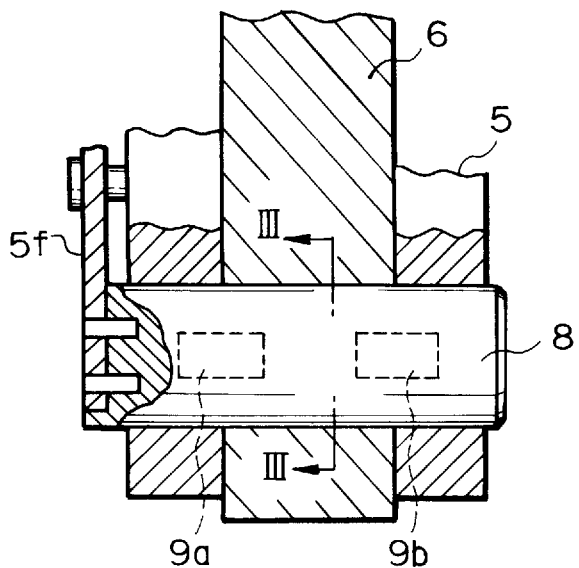
FIG. 2 is a cross-sectional view taken along the line II—II of FIG. 1.

A load transfer and loading device 1, which is shown in FIG. 1, is a hydraulic shovel and has provided in the operator's compartment the weighing equipment 2 for measuring the weight of a load to be transferred, such as sediment. In the hydraulic shovel 1, an undercarriage 3 that travels in contact with the ground using left and right endless chains supports an upper structure 4. Stick 6 is pin-coupled to the proximal ends of booms 5 which are rotatably supported by the upper structure 4. Furthermore, a bucket 7 is pin-coupled to the ends of the sticks 6. The booms 5, the sticks 6, and the bucket 7 may be oscillated by operating the corresponding drive cylinders 5c, 6c, and 7c that extend and retract rods 5r, 6r, and 7r by driving them hydraulically. Rod displacement gauges 15, 16 and 17 for detecting the amount of extension of each rod 5r, 6r, and 7r are attached to the drive cylinders 5c, 6c, and 7c. From the output of the rod displacement gauges 15, 16, and 17, the positions of the movable sections, i.e. the boom 5, the stick 6 and the bucket 7, can accurately be detected.

Figure 3:
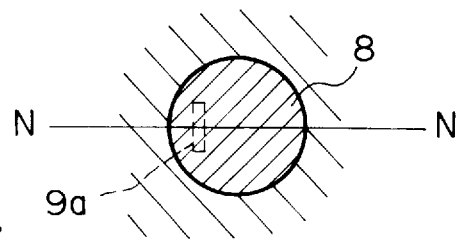
FIG. 3 is a cross-sectional view taken along the line III—III of FIG. 2.
Figure 4:
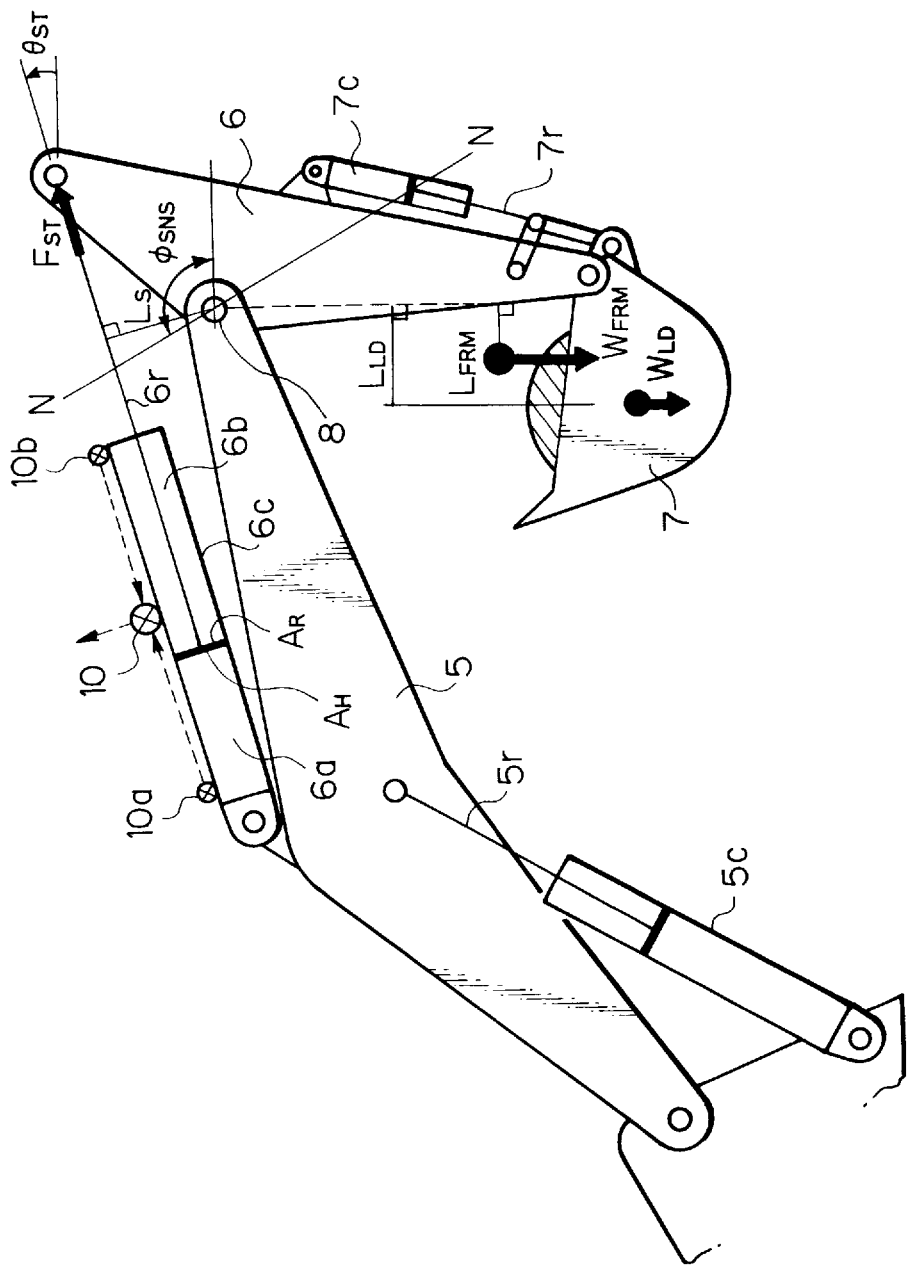
FIG. 4 shows the point and direction of application of the forces applied to the coupling portion between the boom and the stick and the bucket shown in FIG. 1.

The hydraulic shovel has a coupling pin 8 for connecting the boom 5 with the stick 6, which includes a load detector 9 for detecting a load $F_{SNS}$ along a load measurement axis N—N. The driving cylinder 6c for driving the stick 6 includes a push-force detector 10 for detecting the push force $F_{ST}$ applied to the stick 6 to maintain the position of the stick 6. The coupling pin 8 is fixed to the boom 5 by a fixing frame 5f. The load detector 9 comprises a pair of strain detection elements or strain gauges 9a and 9b embedded in the pin at two positions, and the load measurement axis N—N of the detector 9 is at a right angle to the strain detection element 9a (9b) as shown in FIG. 3. The push-force detector 10 has a pair of pressure detection elements 10a and 10b provided in a head side cylinder chamber 6a and a rod side cylinder chamber 6b in the stick drive cylinder 6c as shown in FIG. 4. The push force $F_{ST}$ applied to the stick 6 is detected using the following equation:

$$F_{ST}=E_{PH}A_H-E_{PR}A_R \quad (1)$$

wherein $E_{PH}$ is the pressure in the head side cylinder chamber 6a detected by the pressure detection element 10a, $E_{PR}$ is the pressure in the rod side cylinder chamber 6b detected by the pressure detection element 10b, $A_H$ is the piston pressurized area of the head side cylinder chamber 6a, and $A_R$ is the piston pressurized area of the rod side cylinder chamber 6b.

As shown in FIG. 6, the weighing equipment 2 comprises a calculation storage device 11 to which the load detector 9, stick push-force detector 10, and rod displacement gauges 15 and 16, and display equipment 12 for displaying the results of calculation are connected. The calculation storage device 11 calculates the weight $W_{LD}$ of sediment loaded into the bucket 7 from the load $F_{SNS}$ of the load detector 9, the stick push force $F_{ST}$, the known sum weight $W_{FRM}$ of the stick 6 and bucket 7, the angle $\phi_{SNS}$ between the load measurement axis N—N of the load detector 9 and a specified direction, in this case the horizontal direction, and the angle $\theta_{ST}$ between the direction of the push force $F_{ST}$ applied to the stick 6 and the horizontal direction.

Figure 5:
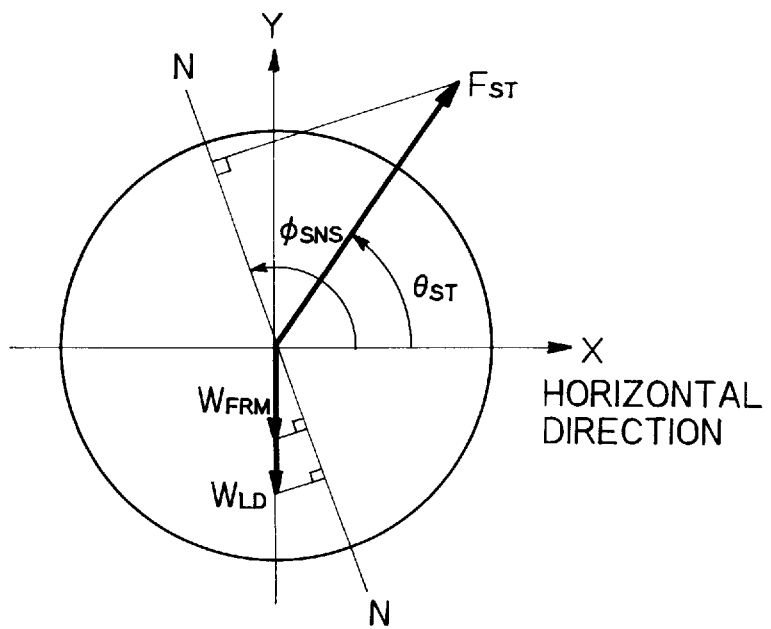
FIG. 5 is a diagram showing the balance of the forces shown in FIG. 4.

That is, if the point and direction of the forces shown in FIG. 4 are put together as shown in FIG. 5, the following equation is established from the balance of the forces in the direction of the load measurement axis N—N of the load detector 9:

$$F_{SNS}+F_{ST}\cos(\phi_{SNS}-\theta_{ST})-(W_{FRM}+W_{LD})\sin\theta_{SNS}=0 \quad (2)$$

provided that $\sin\phi_{SNS}=\cos(\phi_{SNS}-\pi/2)$.

The following equation is obtained by modifying equation (2).

$$W_{LD}=[\{(F_{SNS}+F_{ST}\cos(\phi_{SNS}-\theta_{ST})\}/\sin\phi_{SNS}]-W_{FRM} \quad (3)$$

The angles $\phi_{SNS}$ and $\theta_{ST}$ in equation (3) are determined from the following functional equations (4), (5) the calculation of which are effected in the calculation storage device 11 using the output of the rod displacement gauges 15 and 16 which measure the respective extension $L_{BM}$ and $L_{ST}$ of the rods 5r and 6r of the drive cylinders 5c and 6c of the boom 5 and the stick 6.

$$\phi_{SNS}=f_1(L_{BM}, L_{ST}) \quad (4)$$

$$\theta_{ST}=f_2(L_{BM}, L_{ST}) \quad (5)$$

The weight $W_{LD}$ of sediment to be determined can thus be calculated by assigning the results of equations (4) and (5) to equation (3), and the weight $W_{LD}$ determined is displayed on display equipment 12. The display equipment 12 can display both the weight $W_{LD}$ of sediment loaded into the bucket 7 in each loading operation and the total weight $\Sigma W_{LD}$ of sediment incremented since the first loading operation. The total loading weight $\Sigma W_{LD}$ can thus be displayed in real time, thereby preventing the maximum loading capacity of the truck from being exceeded and allowing loads to be loaded close to the maximum loading capacity.

Figure 7:
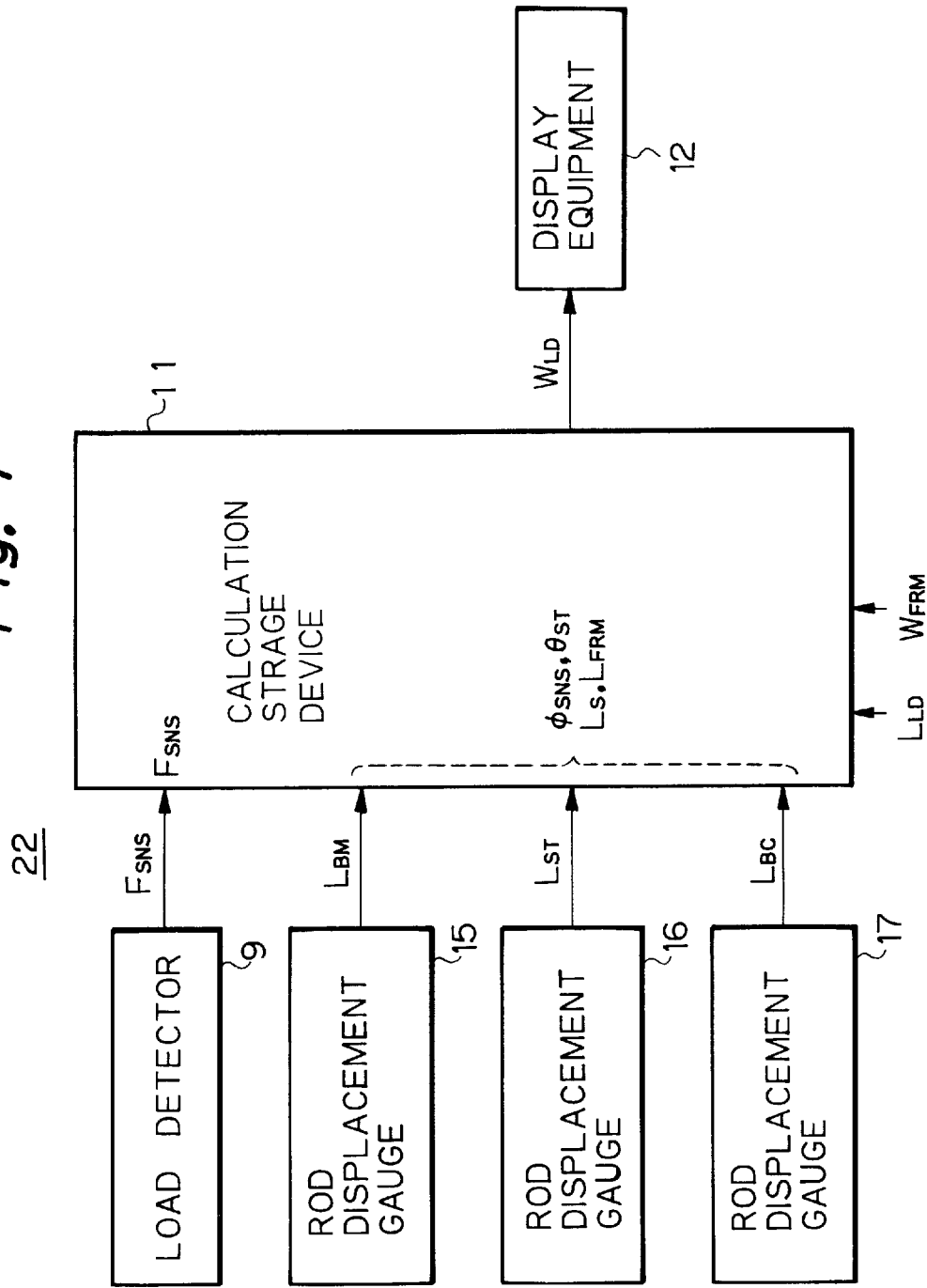
FIG. 7 is a block diagram showing the constitution of the weighing equipment in accordance with another embodiment of this invention.

Although, in the above embodiment, the push force $F_{ST}$ applied to the stick 6 is measured by the stick push-force detector 10, the weight $W_{LD}$ of sediment can substantially be determined without measuring the push force $F_{ST}$, but using the balance of rotation moment around the coupling pin 8 as effected in the weighing equipment 22 in FIG. 7. In this case, if $L_S$ is the length of the arm of a rotation moment caused by the push force $F_{ST}$ around the coupling pin 8, $L_{FRM}$ is the length of the arm of a rotation moment caused by the weight $W_{FRM}$ around the coupling pin 8, and $L_{LD}$ is the length of the arm of a rotation moment caused by the weight $W_{LD}$ of sediment around the coupling pin 8, the following equation is established from the balance of the rotation moments around the coupling pin 8 as shown in FIG. 4:

$$F_{ST}L_S+W_{FRM}L_{FRM}+W_{LD}L_{LD}=0 \quad (6)$$

If $F_{ST}$ is then deleted from equations (2) and (6) using $(2)\times L_S-(6)\times\cos(\phi_{SNS}-\theta_{ST})$, the following equation is obtained:

$$W_{LD}=U/V \quad (7)$$

wherein $$U=\{L_{FRM} \cos (\phi_{SNS}-\theta_{ST})+L_S \sin \phi_{SNS}\}W_{FRM}+F_{SNS}L_S$$

$$V=-\{L_{LD} \cos (\phi_{SNS}-\theta_{ST})+L_S \sin \phi_{SNS}\}$$

$L_S$, $L_{LD}$, and $L_{FRM}$ depend on the positions of the boom 5, the stick 6, and the bucket 7, and can be determined by the following functional calculations (8), (9), (10) using the outputs $L_{BM}$, $L_{ST}$, $L_{BC}$ from the three rod displacement gauges 15, 16, and 17:

$$L_S=f_3 (L_{BM}, L_{ST}) \quad (8)$$

$$L_{LD}=f_4 (L_{BM}, L_{ST}, L_{BC}) \quad (9)$$

$$L_{FRM}=f_5 (L_{BM}, L_{ST}, L_{BC}) \quad (10)$$

The calculation storage device 11 including the weighing equipment 22 does not require a stick push-force detector 10 but requires the addition of a rod displacement gauge 17. As in the above embodiment, this device 11 also can accurately measure the weight $W_{LD}$ of sediment loaded into the bucket in each operation.

Incidentally, $L_{LD}$ and $L_{FRM}$ may have fixed values if it is assumed that the center of gravity of sediment loaded into the bucket 7 and the composite center of gravity of the stick 6 and bucket 7 are approximately fixed.

As described above, this invention allows the weight of the sediment in the bucket to be calculated by detecting the load applied to the pin coupling the boom to the stick and the position of the boom and the stick or the boom, the stick and the bucket, thereby enabling the weight of the load transferred and loaded by the bucket to be measured in each operation. Therefore, even if many loading operations are performed, the loading weight can be calculated each time a loading operation is performed, thereby preventing excess loading onto a truck or other transfer means.

As stated above, the weight $W_{LD}$ of a load in the bucket is preferably calculated in accordance with the following equation:

$$W_{LD}=[\{F_{SNS}+F_{ST} \cos (\phi_{SNS}-\theta_{ST})\}/\sin \phi_{SNS}]-W_{FRM}$$

wherein $F_{SNS}$ is a load applied to the pin coupling the boom to the stick, $F_{ST}$ is a push force that maintains the position of the stick, $W_{FRM}$ is the known sum weight of the stick and bucket, $\phi_{SNS}$ is the angle between the direction of the load $F_{SNS}$ and the horizontal direction, and $\theta_{ST}$ is the angle between the direction of the push force applied to the stick and the horizontal direction. Thus, the combination of a load detector, a push-force detector, a position detector for a boom and a stick, and a calculation means thus allows the weight of a load transferred and loaded by the bucket to be measured accurately in each operation.

The weight $W_{LD}$ is also preferably calculated in accordance with the following equation:

$$W_{LD}=U/V$$

wherein $$U=\{L_{FRM} \cos (\phi_{SNS}-\theta_{ST})+L_S \sin \phi_{SNS}\}W_{FRM}+F_{SNS}L_S$$

$$V=-\{L_{LD} \cos (\phi_{SNS}-\theta_{ST})+L_S \sin \phi_{SNS}\}$$

wherein $L_S$, $L_{FRM}$, and $L_{LD}$ are the lengths of the arms of rotation moment caused around the coupling pin coupling the boom to the stick by the push force $F_{ST}$, the sum weight $W_{FRM}$, and the loading weight $W_{LD}$ of the bucket. Thus, the combination of a load detector, a position detector for a boom, stick and bucket and a calculation means thus allows the weight of a load transferred and loaded by the bucket to be measured accurately in each operation.

Although, in the embodiments described above, the horizontal direction is used as a reference direction to determine the angles $\phi_{SNS}$ and $\theta_{ST}$, it will be apparent that any direction can be used as a reference direction.

Also, in the embodiments described above, although a single load transfer and loading device is coupled with a boom and a stick on one side of a hydraulic shovel, it will be apparent that the device of the invention can be coupled with a boom and a stick on each side of the hydraulic shovel and an average value of the load $L_{LD}$ and forces $F_{SNS}$, $F_{ST}$, could be used in the calculation for seeking the weight $W_{LD}$.

Further, the load transfer and loading device of the present invention can be used in other construction machines than a hydraulic shovel.

What is claimed is:

1. A load transfer and loading device equipped with a boom, a stick, and a bucket which are pin-coupled to each other, with the stick pin-coupled between the boom and the bucket, for loading a load into the bucket, and transferring and loading it onto a specified position, said load transfer and loading device comprising a weighing means for calculating the weight of the load in the bucket from a load applied to a pin directly coupling the boom to the stick, a push force applied to the stick, a known sum weight of the stick and the bucket, and a position of said boom and said stick in accordance with a set of specified equations.

2. The load transfer and loading device as claimed in claim 1, wherein said weighing means comprises a load detector for detecting said load $F_{SNS}$ applied to the pin coupling said boom to said stick and a push-force detector for detecting said push force $F_{ST}$ applied to said stick for maintaining the position of said stick, and calculates the weight $W_{LD}$ of the load in the bucket in accordance with the following equation:

$$W_{LD}=[\{F_{SNS}+F_{ST} \cos (\phi_{SNS}-\theta_{ST})\}/\sin \phi_{SNS}]-W_{FRM}$$

wherein $W_{FRM}$ is the known sum weight of the stick and bucket, $\phi_{NSS}$ is the angle between the load measurement axis of said load detector and a specified direction, and $\theta_{ST}$ is the angle between the direction of the push force applied to said stick and the specified direction.

3. The load transfer and loading device as claimed in claim 2, wherein said specified direction is horizontal.

4. The load transfer and loading device as claimed in claim 2, wherein said load detector comprises strain detection elements embedded in said pin fixed to said boom, and said load $F_{SNS}$ is obtained by measuring the amount of strain in the strain detection elements in the direction of said load measurement axis.

5. The load transfer and loading device as claimed in claim 2, wherein said push-force detector comprises means for measuring a push force applied to a stick drive cylinder.

6. The load transfer and loading device as claimed in claim 2, wherein said angle $\phi_{SNS}$ is obtained by measuring the amount of displacement of the rod of a respective drive cylinder for the boom and the stick.

7. The load transfer and loading device as claimed in claim 2, wherein said angle $\theta_{ST}$ is obtained by measuring the amount of displacement of the rod of a respective drive cylinder for the boom and the stick.

8. The load loading and transfer device as claimed in claim 1, wherein said weighing means comprises a load detector for detecting the load $F_{SNS}$ applied to the pin coupling said boom to said stick to calculate said weight $W_{LD}$ in accordance with the following equation:

$$W_{LD} = U/V$$

wherein $$U = \{L_{FRM} \cos(\phi_{SNS} - \theta_{ST}) + L_S \sin \phi_{SNS}\} W_{FRM} + F_{SNS} L_S$$

$$V = -\{L_{LD} \cos(\phi_{SNS} - \theta_{ST}) + L_S \sin \phi_{SNS}\}$$

wherein $W_{FRM}$ is the known sum weight of the stick and bucket, $\phi_{SNS}$ is the angle between the load measurement axis of said load detector and a specified direction, $\theta_{ST}$ is the angle between the direction of a push force $F_{ST}$ applied to said stick and the specified direction, and $L_S$, $L_{FRM}$, and $L_{LD}$ are lengths of, respectively, the rotation moment arms caused around said pin by said push force $F_{ST}$, said sum weight $W_{FRM}$, and the loading weight $W_{LD}$ of said bucket.

9. The load transfer and loading device as claimed in claim 8, wherein said specified direction is horizontal.

10. The load transfer and loading device as claimed in claim 8, wherein said load detector comprises strain detection elements embedded in said pin fixed to said boom, and said load $F_{SNS}$ is obtained by measuring the amount of strain in the strain detection elements in the direction of said load measurement axis.

11. The load transfer and loading device as claimed in claim 8, wherein said angle $\phi_{SNS}$ is obtained by measuring the amount of displacement of the rod of the respective drive cylinder for the boom and the stick.

12. The load transfer and loading device as claimed in claim 8, wherein said angle $\theta_{ST}$ is obtained by measuring the amount of displacement of the rod of the respective drive cylinder for the boom and the stick.

13. The load transfer and loading device as claimed in claim 8, wherein the length $L_S$ of the arm of said rotation moment is obtained by measuring the amount of displacement of the rod of the respective drive cylinder for the boom and the stick.

14. The load transfer and loading device as claimed in claim 8, wherein the length $L_{LD}$ of the arm of said rotation moment is obtained by measuring the amount of displacement of the rod of the respective drive cylinder for the boom, the stick, and the bucket.

15. The load transfer and loading device as claimed in claim 8, wherein the length $L_{FRM}$ of the arm of said rotation moment is obtained by measuring the amount of displacement of the rod of the respective drive cylinder for the boom, the stick, and the bucket.

16. The load transfer and loading device as claimed in claim 8, wherein the lengths $L_{LD}$ and $L_{FRM}$ of the arms of said rotation moment have fixed values.

* * * * *